United States Patent [19]

Bessho et al.

[11] Patent Number: 4,759,400

[45] Date of Patent: Jul. 26, 1988

[54] BELT TYPE CAST SHEET CONTINUOUS CASTER AND PREVENTION OF MELT LEAKAGE IN SUCH A CASTER

[75] Inventors: Nagayasu Bessho; Hirokazu Tozawa; Tetsuya Fujii; Tsutomu Nozaki; Saburo Moriwaki; Noboru Yasukawa; Masaaki Kuga; Michio Suzuki; Nozomu Tamura, all of Chiba; Tomoaki Kimura, Hitachi, all of Japan

[73] Assignees: Kawasaki Steel Corporation, Hyogo; Hitachi, Ltd., Tokyo, both of Japan

[21] Appl. No.: 914,015

[22] Filed: Oct. 1, 1986

[30] Foreign Application Priority Data

Oct. 3, 1985 [JP] Japan .................... 60-219195
Jul. 17, 1986 [JP] Japan .................... 61-166728
Sep. 19, 1986 [JP] Japan .................... 61-219800

[51] Int. Cl.⁴ .................... B22D 11/06; B22D 11/124
[52] U.S. Cl. .................... 164/481; 164/485; 164/443; 164/431; 164/432
[58] Field of Search ............... 164/430, 431, 432, 443, 164/481, 485

[56] References Cited

U.S. PATENT DOCUMENTS 3,426,836 2/1969 Altenpohl et al. .................... 164/481
3,937,270 2/1976 Hazelett et al. .................... 164/481
4,635,703 1/1987 Nakato .................... 164/432

FOREIGN PATENT DOCUMENTS 0185956 7/1986 European Pat. Off. .
2145358 3/1985 United Kingdom .

OTHER PUBLICATIONS

Patents Abstracts of Japan, vol. 9, No. 164 (M-395), [1887], 10th Jul. 1985; & JP-A-60 37248 (Ishikawajima Harima Jukogyo K.K.) 26-02-1985.
Patent Abstracts of Japan, vol. 9, No. 242 (M-417) [1965], 28th Sep. 1985; & JP-A-60 96 354 (Kawasaki Seitetsu K.K.) 29-05-1985.

Primary Examiner—Nicholas P. Godici
Assistant Examiner—Richard K. Seidel
Attorney, Agent, or Firm—Balogh, Osann, Kramer, Dvorak, Genova & Traub

[57] ABSTRACT

A belt type cast sheet continuous caster of the type comprises a pair of opposed circulatorily movable belts, a pair of opposed side plates arranged along opposite side edge portions of the movable belts, coolers which each have numerous water feed openings and water discharge openings opened to the movable belt and are arranged behind the respective movable belts, and movable partition plates which are placed in respective cooling headers and each connected to driving means for moving the partition plates in a width direction of a cast sheet. A casting space is defined by the movable belt and the side plates. Melt leakage at sliding portions between mold short side plates and the metal belts in a belt type cast sheet continuous caster comprising the metal belts and the mold short side plates arranged along side edge portions of the metal belts and cooleres, which each have numerous water fed openings and water discharge openings opened to the metal belt and are arranged behind the respective metal belts, is prevented by controlling gaps between the metal belts and the mold short side plates through varying a pushing force of the metal belts to the mold short side plates.

11 Claims, 12 Drawing Sheets

FIG.1d

FIG_1f

FIG_2a

FIG_3a

FIG_3b

FIG_3c

FIG. 4

FIG_5a

FIG_5b

BELT TYPE CAST SHEET CONTINUOUS CASTER AND PREVENTION OF MELT LEAKAGE IN SUCH A CASTER

BACKGROUND OF THE INVENTION (1) Field of the Invention

The present invention relates to a belt type cast sheet continuous caster (a so-called belt caster) for directly casting a sheet- or bar-like steel strip from a molten metal.

More specifically, the invention relates to an improvement of cooling systems arranged behind belts for supporting longitudinal side faces of a cast strip, and the invention is particularly directed to a proposal for a steel continuous casting technique which allows cooling without causing belt thermal deformation or melt leakage occurrence even when steel strips having different widths are produced.

(2) Related Art Statement

As converged type belt casters using a pair of circulatorily movable belts opposed to each other at a part of running paths thereof, there is a caster disclosed in Japanese Patent Laid-open No. 59-92,154 as shown in FIG. 2. According to this known belt caster, coolers so-called "cooling pads" having numerous water feed and discharge openings opened to movable (metal) belts are arranged behind the belts. The belt is cooled by forming a flowing water film of cooling water between the cooling pad and the belt.

Figure 2A:
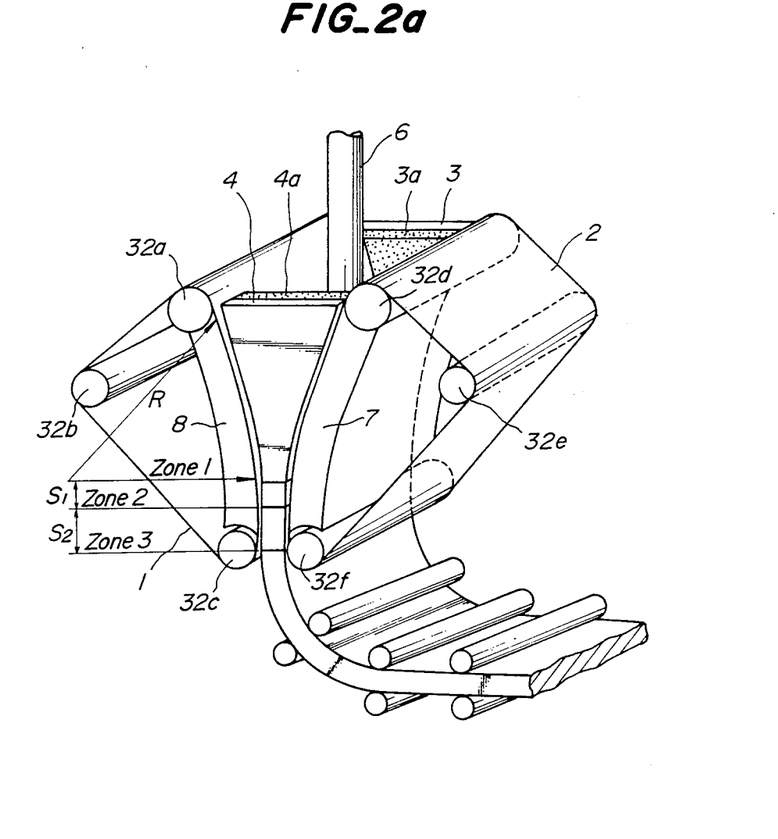
FIG. 2(a) to FIG. 2(d) are a perspective view of the belt caster, and a partially decomposed enlarged view, a plain view, and a sectional view of a part of cooling pad of the belt caster, respectively.

In the belt type continuous caster shown in FIG. 2(a), a casting space is defined by opposed metal belts 1 and 2 which are circulated via plural guide rolls 32a,32b,32c,32d,32e and 32f and constitute longitudinal side faces while a gap is maintained therebetween over a specific distance for holding a molten steel or a solidified shell, and mold short side plates 3 and 4 brought into intimate contact with the metal belts 1 and 2 near the side edge portions thereof. In particular, since the diameter of a pouring nozzle 6 is not less than about 100 mm and the thickness of a cast sheet is not more than 50 mm, each of the mold short side plates 3 and 4 is designed in such a substantially inverse triangle with a wider upper portion that it becomes gradually narrower toward the lower portion and has a constant width at the lower portion. The short side plates have refractory lining layers 3a and 4a, respectively.

Figure 2B:
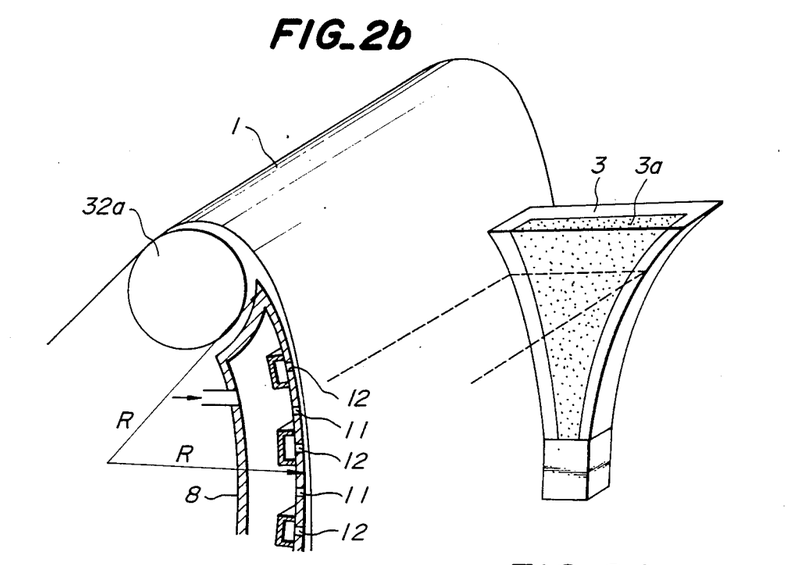
Figure 2C:
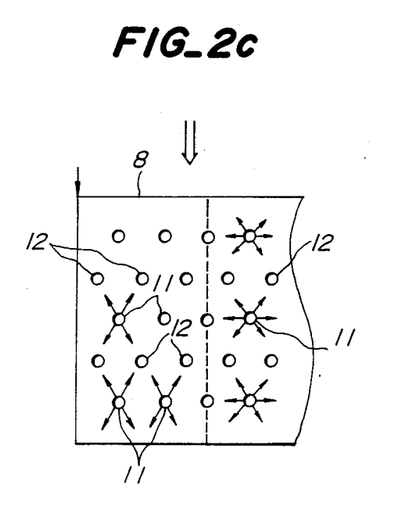
Figure 2D:
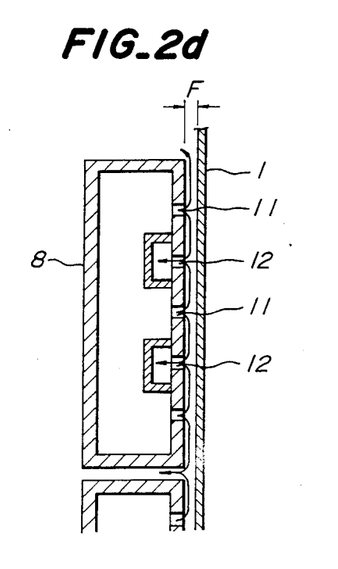

Further, as shown in FIG. 2(b), cooling pads 8 each having water fed openings 11 and water discharge openings 12 are provided behind the metal belts 1 and 2 as coolers. For instance, as shown in FIG. 2(c), water feed openings 11 of the cooling pads are provided in a row in a width direction of the cooling pad, and water discharge openings 12 are provided in the next row. In the same manner, rows of the water feed openings and rows of the water discharge openings are alternatively provided in the vertical direction of the cooling pads, that is, in the casting direction. While cooling water flowing out from the water feed openings 11 flows into the water discharge openings 12, a flowing water film F is formed between the metal belt 1 and the cooling pad 8 as shown in FIG. 2(d), thereby cooling and supporting the metal belt.

Apart from the above technique, the present inventors have make it possible to widely sue the belt caster through movably supporting side plates which support respective short side faces of the molten metal or the cast strip and thereby allowing change in the casting width and realizing the casting in different widths. However, there have occurred the following problems peculiar to the casting of the cast strips of different widths. The problems have been solved by the present invention.

Figure 3A:
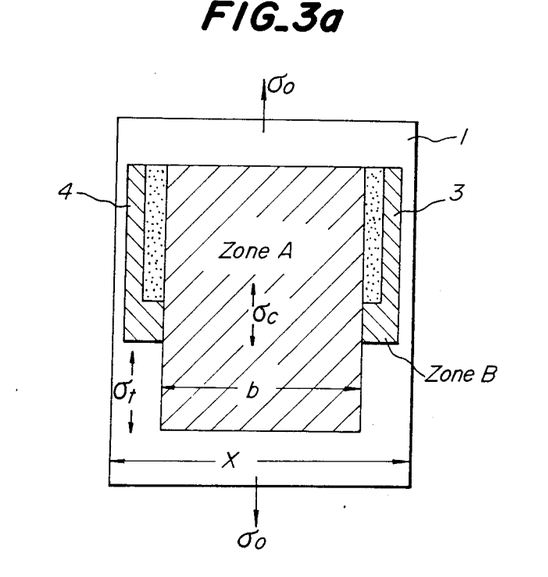
FIGS. 3(a) to 3(c) are a schematic view illustrating a belt tension distribution, a schematic sectional view of a part of the cooling system, and a schematic diagram showing the relation between a distance in the belt width direction and the pressure of the water film, respectively.

1. Prevention of fins:

As shown in FIG. 3(a) an external force applied to the moving belt on the cooling pad side is divided according to (1) a zone (zone A) being in contact with the cast strip or the molten steel and (2) the opposite side zones of the movable belt (zone B) adjacent to the zone A on the basis of variations in tension, thermal stress, static pressure of the molten steel, etc. applied onto the movable belt, and both the zones are extremely different from each other. Therefore, the thickness of the water flow film is not uniform between both the above zones. Particularly, when the thickness of the flowing water film on the opposite side zones of the movable belt becomes smaller, a gap between the belt and the mold short side plate is largely opened, so that the molten steel may enter the gap to cause fins.

Assuming that a belt temperature difference between the zones A and B is taken at $\Delta T(°C.)$, belt tensions $\sigma_c$ and $\sigma_t$ in the zones A and B, respectively, due to thermal stress produced in the movable belt 1 during pouring are given by the following expressions, respectively:

$$\sigma c = \sigma o - \frac{B-b}{B} \Delta\sigma \quad (1)$$

$$\sigma t = \sigma o + \frac{b}{B} \Delta\sigma \quad (2)$$

in which $\Delta\sigma$ is a stress produced by the thermal stress, and represented by the following equation (3):

$$\Delta\sigma = \alpha \Delta TE \quad (3)$$

and $\sigma o$, B, b, $\alpha$, and E are an initial stage tension (kg/mm$^2$) of the belt, the width (mm) of the belt, the width of a cast strip (mm), a coefficient of linear thermal expansion of the belt, and a Young's modulus of the belt, respectively.

According to the inventor's investigation, it was recognized that different functions are needed in the roles of the cooling pads 7, 8 between the flowing water film corresponding to the zone A and that corresponding to the zone B.

(i) The water film at the zone A has a function to cool and support a cast strip through the movable belt.

(ii) The water film at the zone B has a function to narrow a space between the side plate (mold short side plate) and the movable belt and prevent the melt leakage, at the zone where the side plate is present.

Further, the present inventors revealed through their investigation that when the cooling pad 7 is curved at the upper portion and is made flat at the lower portion, the cooling pad 7 is divided into the following three zones in the casting direction, as shown in FIG. 2a.

Zone 1: Zone wherein the pad face has a curvature R and the side plates are present in the side edge portions of the belt Zone 2: Zone where the pad face is flat and the side plates are present at the side edge portions of the belt Zone 3: Zone where the pad face is flat and no side plates are present at the side edge portions of the belt.

Figure 3B:
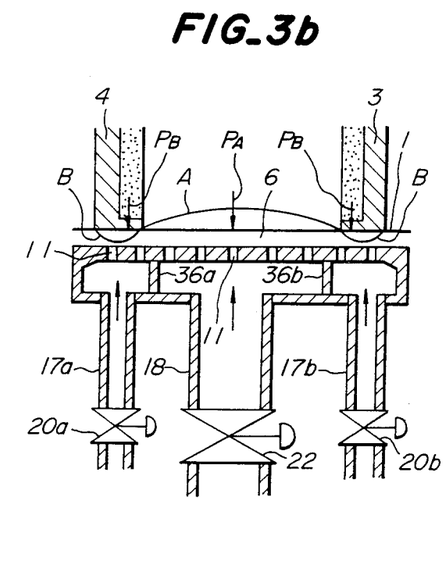
Figure 3C:
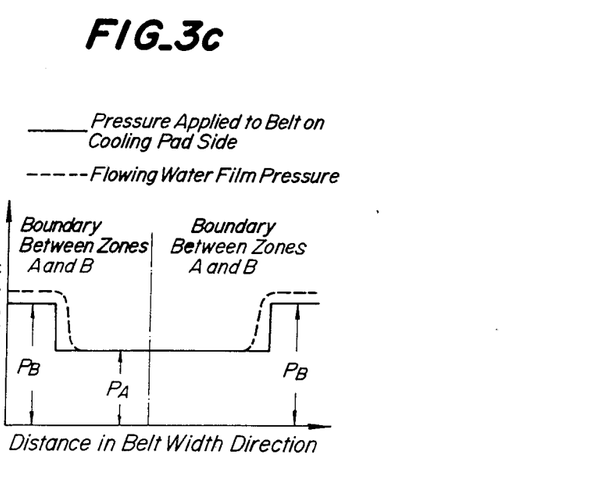

In the zone 1, pressures $P_A$ and $P_B$ which the flowing water film is required to support at the zones A and B, respectively, are given by the following expressions (see FIG. 3(b) and FIG. 3(c)):

$$\text{Zone } A: P_A = \frac{\sigma_c h}{R} + \text{(Static pressure of molten steel)}$$

$$\text{Zone } B: P_B = \frac{\sigma_c h}{R}$$

where h is the belt thickness.

Therefore, since $P_A$ and $P_B$ are not equal to each other and $\sigma_t >> \sigma_c$, $P_A$ is always smaller than $P_B$.

In FIGS. 3(b) and (c) are schematically illustrated $P_A$, $P_B$ and the pressure $P_W$ of the water flow film in the width direction thereof.

In the zone B, when $P_W < P_B$, a melt leakage occurs between the side plates 3 and 4 and the moving belts 1.

In the zone A, when $P_W >> P_A$, the thickness of the water flow film becomes larger, so that the thermal deformation of the belt occurs due to the insufficient cooling capacity, and it causes the change in the thickness of the cast strip.

When $P_W << P_A$, the flowing water film is cut to cause the thermal deformation of the belt.

As explained in the above, it was ultimately found out that when the flowing water film from the cooling pad is used for cooling and supporting the cast strip, it is necessary to provide difference in the pressure of the flowing water film in the belt width direction between opposite sides of near a portion where the side plates contacts with the molten steel.

On the other hand, the following measures (i) and (ii) are considered as means for affording difference in the pressure of the water film in the width direction.

(i) A water feed header portion inside the pad 7 is divided corresponding to the zones A and B by partition walls and cooling water is supplied to the zone B at a greater flow rate per unit width as compared with the zone A.

(ii) A water discharge header portion inside the pad 7 is divided corresponding to the zones A and B by partition walls and the flow path resistance of discharge water in the zone B is made larger as compared with the zone A.

However, the pad (cooler) having the fixed partition walls in the header as shown in FIG. 3(b) can cope with the casting of a cast strip having a specified width, but it suffers the following casting troubles when the width of the cast strip is varied:

(i) When the width of the cast strip is larger than the specified one, the pressure of the water film at a part of the zone A becomes higher, so that the thickness of the water film increases to make the shape of the cast strip poorer and/or produce the thermal deformation of the belt.

(ii) When the width of the cast strip is smaller than the specified one, the pressure of the water film at a part of the zone B becomes lower than the specified water film pressure, so that a gap is produced between the side plate and the movable belt to cause the fins.

In addition, since the cooling pad 7 is flat in the zone 2, the $P_A$ and $P_B$ become as follows:

$P_A$: molten steel static pressure
$P_B$: 0

However, since a force must be assured for pushing the movable belt to the side edge face of the side plates, the condition that the flowing water film pressure at the zone A is smaller than that at the zone B must be satisfied, and the conditions in the zone 1 must also be assured.

2. Prevention of unbalanced flow rate of cooling water:

Next, an external force applied to the belt in the zone 3 where the cooling pad is flat and no short side plate is present is:

$P_A$: molten steel static pressure
$P_B$: 0

Figure 4:
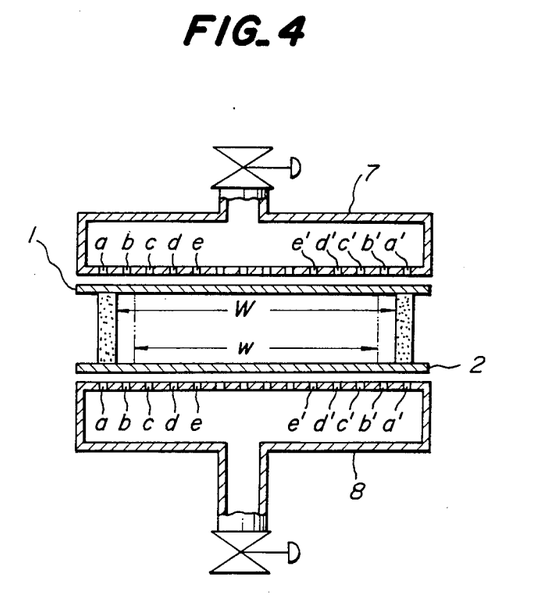
FIG. 4 is a sectional view of the cooling system for illustrating influences upon the pressure of the water film when the width of the strips is changed.

FIG. 4 shows a conventional cooling system. When the casting width is wider (W), the water flow film in the liquid passing through a space between the movable belt and the cooling pad body receives substantially the equal internal pressure over the whole zone (a—a′) in the width direction and thereby uniform cooling is carried out. However, when the casting strip is narrow (w), the internal pressure of the water film flowing inside the liquid-passing space differs between the locations a,a′, and an interval from b to b′ and a larger amount of cooling water flows through water feed openings at a,a′, having a smaller flow path resistance, so that an amount of the cooling water necessary for cooling the cast strip is lacking at the b-b′ interval as a main cooling section. Consequently, it is often seen that such leads to casting troubles such as deformation of the movable belt and the break-out.

Moreover, the conventional cooling system having the structure that the fixed partition walls 36a and 36b are provided in the water feed headers in the cooling pads 7 and 8 as shown in FIG. 3(b) can cope with only a case where the casting width is constant, but when the casting width is varied, such a cooling system has the defects that the thermal deformation of the movable belts, wasteful use of cooling water, and disorder of the cast strip shape occur.

(3) Prevention of belt thermal deformation:

In order to prevent the thermal deformation of the belts over the zones 1, 2 and 3, it is necessary to decrease $\Delta\sigma$ shown by the above expression (3). In order to decrease the $\Delta\sigma$, it is necessary to make the temperature different $\Delta T$ between the zones A and B smaller. In order to make $\Delta T$ smaller, it is effective that the water feed header sections to the zones A and B are isolated from each other, and a fluid having a temperature higher than that of the cooling fluid fed to the zone A is fed to the zone B.

The cooling pad in which the inside of the header is divided by the fixed partition walls as shown in FIG. 3(b) cannot cope with the different width casting, and has the shortcomings that when the steel strips with different widths are produced, casting troubles due to the thermal deformation of the belts, bad shape of the cast strip, and the fins occur.

SUMMARY OF THE INVENTION

An object of the present invention is to overcome the above-mentioned problems 1 to 3 encountered by the prior art belt casters.

According to the present invention, there is a provision of a belt type cast sheet continuous caster of the type in which a casting spaced is constituted by a pair of opposed circulatorily movable belts and a pair of opposed side plates arranged along opposite side edge portions of the movable belts and coolers each having numerous water feed openings and water discharge openings opened to the movable belt are arranged behind the respective movable belts, wherein movable partition plates are placed in a header of each of the coolers and each are connected to drive means for moving the partition plates in a width direction of the cast sheet.

According to another aspect of the present invention, there is a provision of the belt type cast sheet continuous caster in which the movement of the above movable plates is synchronized with that of the opposite side plates, when the width of a cast sheet to be cast is intended to be varied.

According to a still another aspect of the present invention, there is a provision of the belt type cast sheet continuous caster of the construction in which water feed pipes or water discharge pipes are connected to the corresponding header sections partitioned by the movable partition plates and are provided with respective flow rate adjusting valves or throttle valve.

According to a further aspect of the present invention, there is a provision of the belt type cast sheet continuous caster in which portions of the header sections at which the movable belts are in no contact with the cast sheet are constituted as low pressure cooling water supply zones.

According to a still further aspect of the present invention, there is a provision of the belt type cast sheet continuous caster in which the pressure of the water film at a portion of the header sections at which the movable belts are just in contact with the side plates is made higher.

According to a still further aspect of the present invention, there is a provision of the belt type cast sheet continuous caster in which a high temperature fluid pipe line is connected to a part of the header sections partitioned by the movable partition plates and a high temperature fluid (warm water or steam) pipe line is connected to the remainder.

According to a further aspect of the present invention, there is a provision of a method of preventing melt leakage at sliding portions between mold short side plates and metal belts in a belt type cast sheet continuous caster in which a casting space is constituted by the metal belts and the mold short side plates arranged along side edge portions of the metal belts and coolers each having numerous water feed openings and water discharge openings to the metal belt are arranged behind the respective metal belts, wherein a gap between the metal belt and the mold short side plates is controlled by varying a pushing force of the metal belts to the mold short side plate.

According to a still further aspect of the present invention, there is a provision of the method of preventing the melt leakage in the belt type cast sheet continuous caster, wherein the pushing force of the metal belt to the mold short side plates is realized such that the pressure of the water film applied to the back force of the metal belt over the width direction of the metal belt is made larger on the side portions of the mold short side plates and smaller at the central portion.

According to a still further aspect of the present invention, there is a provision of the method of preventing a metal leakage in the belt type cast sheet continuous caster, wherein the pushing force of the metal belt to the mold short side plate is not more than 3 atm.

According to a still further aspect of the present invention, there is a provision of the method of preventing a melt leakage in the belt type cast sheet continuous caster, wherein a gap $\delta$(mm) between the metal belt and the mold short side plates is controlled in relation to the thickness $\delta w$(mm) of the water filming during casting to satisfy the following formula:

$$\delta - 0.2\ mm \leq \delta w < \delta$$

BRIEF DESCRIPTION OF THE INVENTION

For a better understanding of the invention, reference is made to the attached drawings, wherein.

DETAILED DESCRIPTION OF THE INVENTION

The above-mentioned problems 1 to 3 are coped with by the present invention as follows:

1. Countermeasure for preventing the fins (zones 1 and 2 corresponding to the mold short side plates):

when the width of the cast strip is varied, the mold (short side) side plates are moved. At that time, the partition plates 9a, 9b, 10a and 10b in the water feed headers of the cooling pads 7 and 8 are moved, and the amount (q=Q/2w:Q and w are a flow rate per water feed opening and a pitch of water feed openings) per unit width of the cooling pad of cooling water at the flowing water film behind the movable belts positioned at places corresponding to the side plates 3 and 4 is made larger than that at the zone A where the cast strip is in contact with the movable belts 1 and 2. Simultaneously or alternatively, the partition plates 9a,9b,10a and 10b in the water discharge headers are moved, and the resistance of the water discharge flow passages positioned at places corresponding to the mold side plates is made larger than that at the cast strip-cooling site, that is, the central zone of the movable belts in the width direction, so that the zone at which the pressure of the water film is larger is moved corresponding to the movement of the side plates following the change in the width of the cast strip. Thereby, the cast sheet continuous casting can be smoothly realized without causing the fins between the side plates and the belts.

2. Countermeasure for preventing the unbalanced flow rate of cooling water:

When the width of the cast strip is varied, the side plates are moved. At that time, the partition plates 9a,9b,10a, and 10b in the water feed headers and of the cooling pads 7 and 8, respectively, below the mold short side plates (zone 3) are moved, and the water feed amount per unit width of the cooling pad at the zone B is made smaller than that at the zone A, while the amount of cooling water necessary for supporting and cooling the cast strip is in turn fed to the water feed openings at the zone A. Thereby, the cast sheet can be continuously cast without any trouble. Simultaneously or alternatively, the partition plates 9a to 10b in the water discharge headers are moved, and the resistance of the water discharge passages positioned in the zones B is made larger than that in the zone A. Thereby, (i) the flowing water film at the zone A can assure the flow rate of cooling water necessary for cooling the cast strip-supporting belts or the cast strip, and (ii) the flowing water films at the zones B can assure the minimum flow rate of cooling water necessary for lubricating the movable belts or the cooling pads.

3. Countermeasure for preventing the thermal deformation of the belts (zone 1,2 and 3):

When the width of the cast is varied, the mold short side plates are moved. At that time, the partition plates 9a,9b,10a and 10b in the water feed headers are correspondingly moved, and an ordinary temperature cooling fluid is fed to the zones B through the water feed openings 11, while a higher temperature fluid, for instance, warm water or steam, is fed to the zone A through the water feed openings 11. Thereby, smooth cast sheet continuous casting can be realized without causing thermal deformation of the movable belts or fins.

FIG. 1(a) to FIG. 1(f) show converged type belt casters according to the present invention mainly putting light upon the cooling systems. These cooling systems are applied to such a converged type belt caster as shown in FIG. 2. This belt caster is constituted such that a gap for holding a molten steel and its solidified cast strip over a specified distance is formed by a pair of circulatorily movable metal belts 1 and 2 in an opposed arrangement and a converged casting space 5 is defined by a pair of the opposed metal belts and a pair of side plates 3 and 4 which are arranged between the movable metal belts 1 and 2 and near the side edge portions thereof and are movable in the width direction and that cooling pad bodies 7 and 8 are arranged behind the metal belts 1 and 2 via liquid passing spaces 6 for cooling the movable belts 1 and 2.

The casting space 5 is determined by the movement of the side plates 3 and 4 which are moved by side plate driving means 15a and 15b, resulting in the casting width. Depending upon the casting width, partition plates 9a,9b,10a and 10b placed in the cooling pad bodies 7 and 8 respectively are moved at selected locations through partition plate driving means 13a,13b,14a and 14b, respectively.

In the following, concrete examples of fins-prevention, cooling water flow rate unbalance-prevention, and belt thermal deformation-prevention will be described.

Figure 1A:
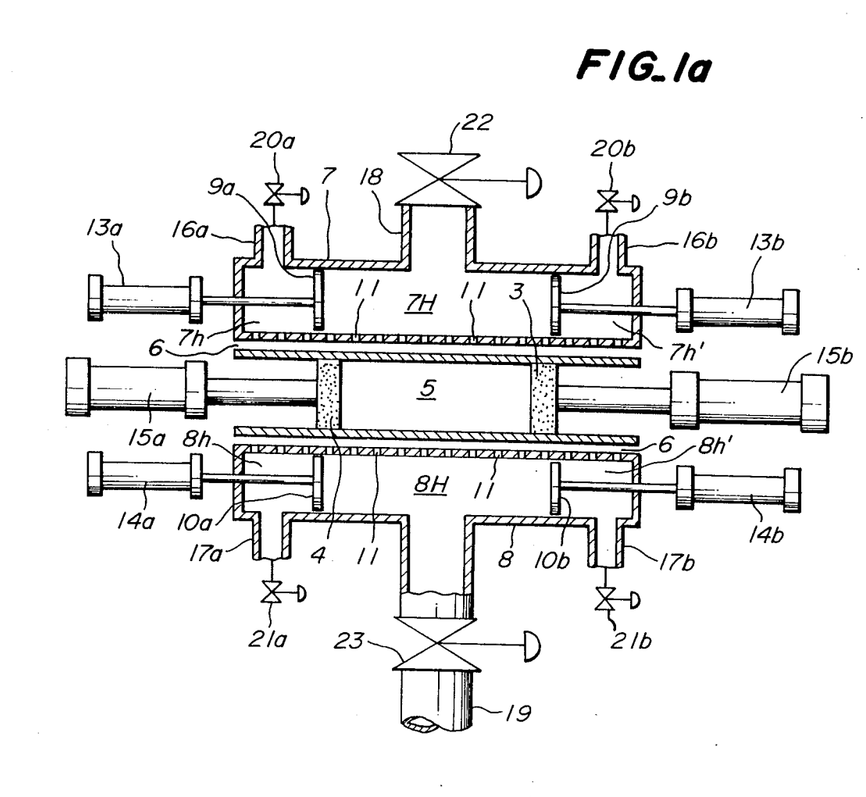
FIG. 1(a) to FIG. 1(f) are schematic view of various embodiments of the cooler system used in the belt caster according to the present invention, FIG. 1(a) to FIG. 1(c) showing examples of water feed headers, FIG. 1(d) and FIG. 1(e) showing examples of water discharge headers, and FIG. 1(f) showing an example using warm water.

(1) Example of fins-prevention:

For instance, water feed headers of the structure shown in FIG. 1a are used for the cooling pads 7 and 8. For example, when the partition plates 9a,9b,10a and 10b are moved depending upon the casting width, adjustment is so made that the pressure of the flowing water films at places corresponding to the casting space may be larger. That is, as compared with the central portion, cooling water flowing through the opposite side portions of the movable belts 1 and 2 (zones being outside the casting space and in no contact with the cast strip) is flown in a greater amount per unit width to make the pressure of the flowing water film at the side portions larger, as compared with the central portion. At that time, cooling water is flown through the central portion in a given amount necessary for cooling the belts. In order to attain the above object, it is necessary that the water feed headers 7 and 8 constituting the cooling pad bodies are provided with side water feed pipes 16a,16b,17a and 17b and central water feed pipes 18 and 19, respectively, of which flow rates can be independently and respectively adjusted, together with the movable partition plates 9a,9b, 10a and 10b, respectively. The above water feed pipes are independently and respectively connected to the respective 7h,7h',8h,8h', on the opposite sides and the header spaces 7H and 8H at the central portion. Side flow rate adjusting valves 20a,20b,21a and 21b are provided in the side water feed pipes 16a,16b,17a and 17b, respectively. Central flow rate adjusting valves 22 and 23 are provided in the central water feed pipes 18 and 19, respectively. In this way, the feed pipes are so constituted that they may comply with the variation of the size of the header spaces due to the movement of the partition walls 9a,9b,10a and 10b and adjustment of the pressure of the flowing water films at the respective water flowing zones 1 that is, they may be independently controlled.

Figure 1B:
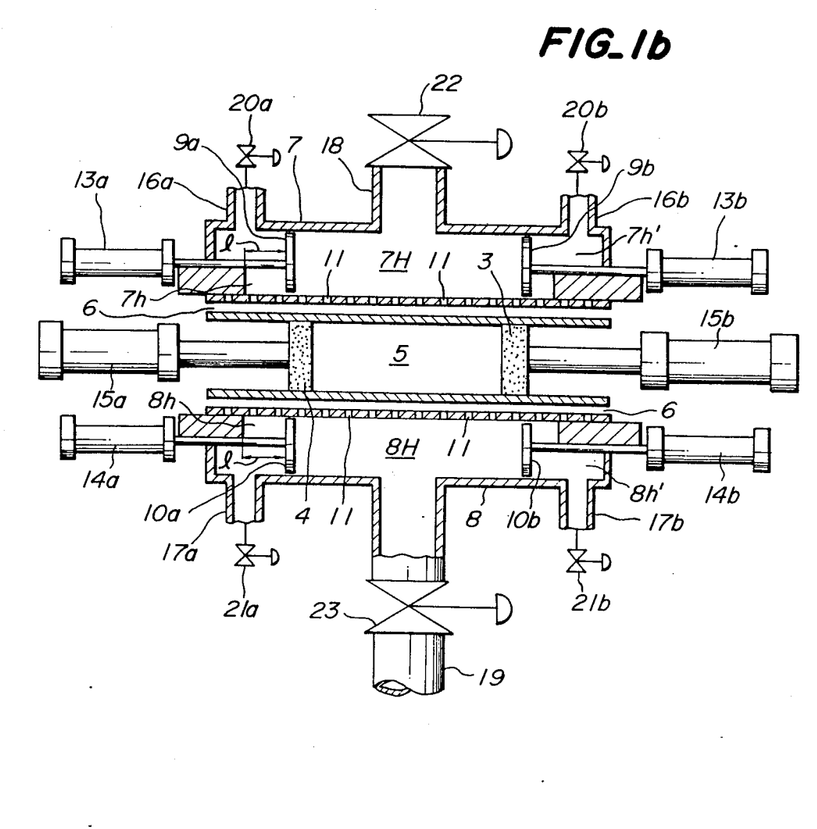

As another embodiment of the above type, the shape of the partition plates and the headers may be designed as shown in FIG. 1b to restrict the effective width in which the flow rate of the cooling water can be increased. In this embodiment, the water feed openings 11 in the zone B are closed except for those in the effective width 1, so that a larger amount of cooling water is flown through the water feed openings within the effective width 1.

Figure 1C:
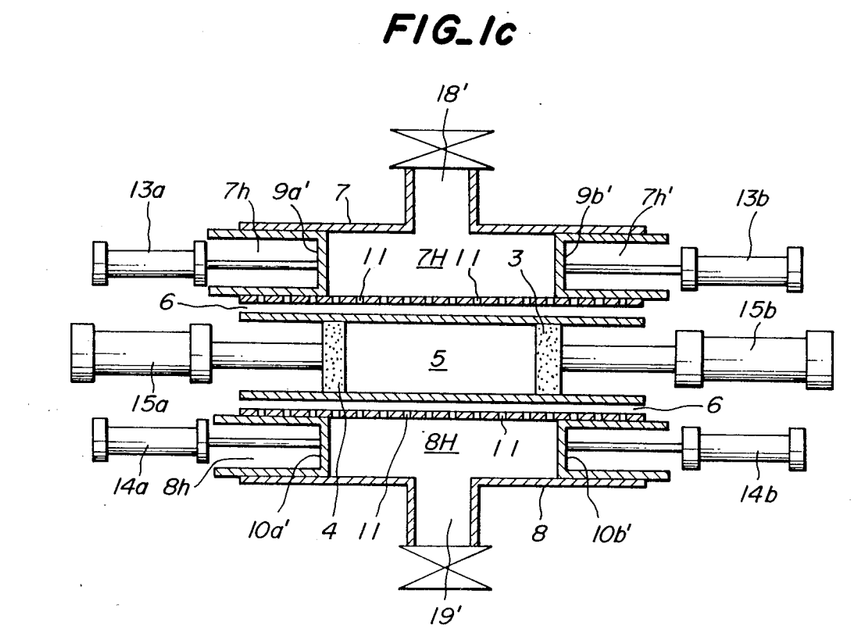
Figure 1D:
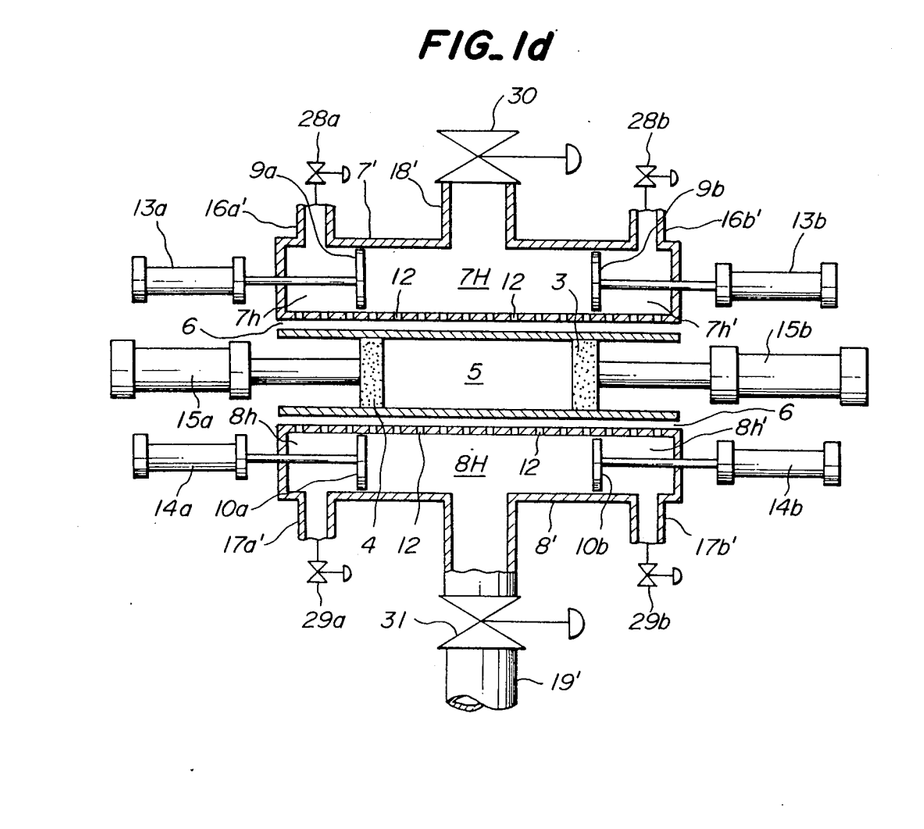

When a cooling system of the structure illustrated in FIG. 1(d) is employed for water discharge headers 7' and 8' together with countermeasure for the above water feed means, the pressure of the flowing water film on the side portions further increases to more effectively prevent fins. In this embodiment, side throttle valves 28a,28b,29a and 29b and central throttle valves 30,31 are provided in side headers 7h,7h',8h and 8h' and central headers 7H and 8H, respectively.

Figure 1E:
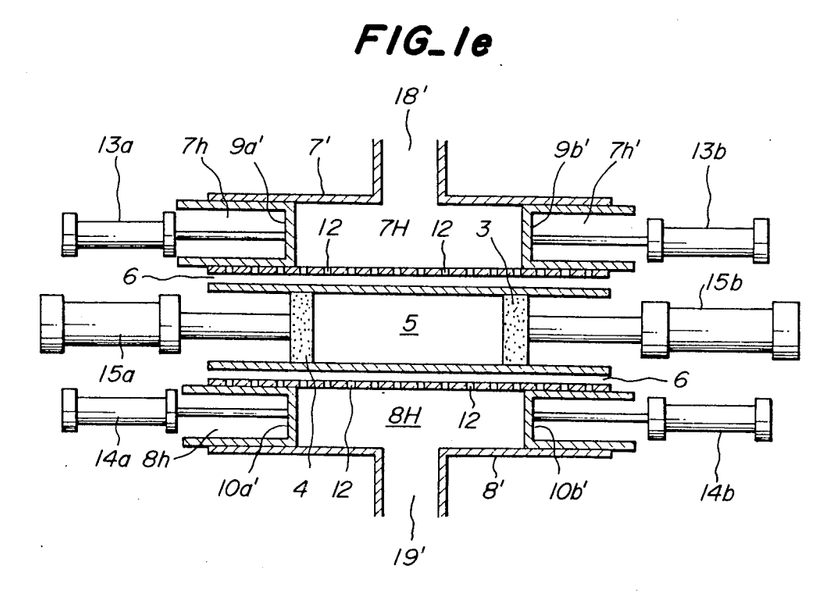

FIG. 1(e) shows a still another embodiment using water discharge headers 7' and 8'. Different from FIG. 1(d), the shape of the partition plates 9a,9b,10a and 10b for the water discharge headers 7' and 8' are each designed in a cylindrical form to close the water discharge openings 12 over a certain distance. As the side plates 3 and 4 move, the cylindrical movable partition plates 9a',9b',10a' and 10b' are moved to specified locations via the partition plate driving means 13a,13b,14a and 14b, respectively, as in the partition plates of FIG. 1(a), so that the locations closing the water discharge openings 12 may substantially correspond to those of the side plates 3 and 4.

As mentioned in the above, the partition plates 9a,9b,-10a and 10b are moved according to the casting width to close the discharge passages for water flowing through the opposite side portions of the movable belts 1 and 2, that is, the water discharge openings 12, so that the pressure of the water film at the opposite side portions may be larger than that of the central portion. Different from the technical idea that the headers are divided, according to this embodiment in which the side portions are closed by use of the cylindrical partition plates 9a' to 10b', the spaces of the central headers 7H and 8H are varied to correspond to the casting width.

(2) Examples of preventing unbalanced flow rate of cooling water:

As water feed headers, those of the embodiment of FIG. 1(a) is used. An amount of the cooling water flowing through the opposite side portions of the movable belts 1 and 2 which need not be strongly cooled can be suppressed to the minimum necessary amount (for the formation of the flowing water film for effectively performing the sliding lubrication between the belts and the pads) by moving the partition plates 9a,9b,10a and 10b depending upon the casting width. On the other hand, sufficiently strong cooling is effected at the central portion.

To accomplish the above object, the water feed pipes 16a,16b,17a, 17b,18 and 19 connected to the water feed headers 7 and 8 are dividingly connected to the opposite side header spaces 7h,7h',8h and 8h' and the central header spaces 7H and 8H defined by the movable partition plates 9a,9b,10a and 10b, respectively. Flow rate adjusting valves 20a,20b,21a, 21b,22 and 23 are provided in the water feed pipes 16a,16b,17a,17b,18 and 19, respectively, so that they may be independently controlled to comply with the size of the header spaces varied with the movement of the partition plates 9a,9b,-10a and 10b and to adjust the pressures of the flowing water films at the respective water flowing zones.

As the cooling pads, that is, the water headers 7 and 8, those constituted as shown in FIG. 1(c) may be used. This embodiment uses cylindrical partition plates 9a',9b',10a' and 10b'. These partition plates 9a' to 10b' are positioned nearer the side edge portions in the width direction than the locations corresponding to the side plates. The cylindrical partition plates have only the function to interrupt the water passages in the water headers 7 and 8. In this embodiment, therefore, the side water feed pipes 16a to 17b and the side flow rate adjusting valves 20a to 21b are unnecessary.

Figure 1F:
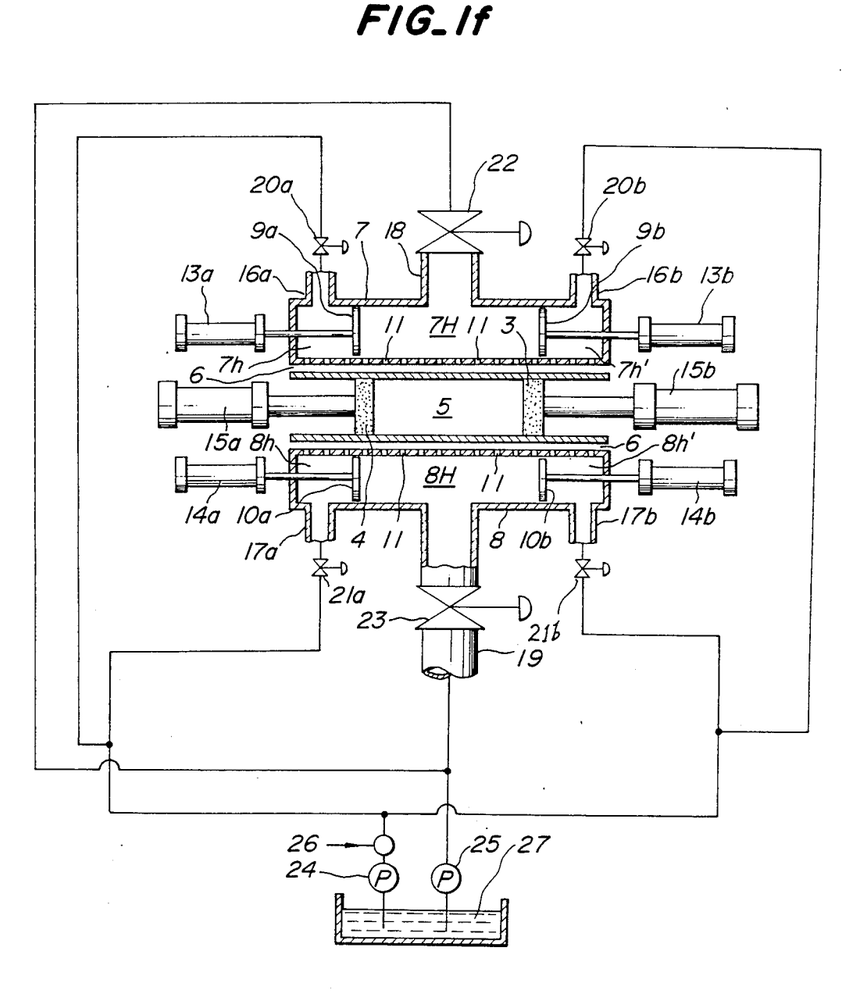

(3) Example of preventing the belt thermal deformation:

FIG. 1(f) shows the water feed headers in the case that the belt edge portions are heated with warm water. To the side headers 7h,7h',8h and 8h' is supplied warm water produced in a steam/water mixer (steam 26) through a cooling water pump 24. On the other hand, cooling water in a cooling water pit 27 is supplied to the central headers 7H and 8H through a cooling water pump 25. As the side plates 3 and 4 are moved, the partition plates (header partition walls) 9a,9b,10a and 10b between the side portions on the warm water side and the central portion on the cooling water side are moved to the specified locations via partition plate driving means 13a,13b,14a and 14b, sohat the effective width of the central headers 7H and 8H is made coincident with the casting width.

As mentioned in the foregoing, according to the present invention, uniform cooling can be always performed in the width direction in the case of the different width casting, and ultimately the fins can be prevented without causing unbalanced flow rate, belt deformation, or other casting troubles.

Next, further embodiments according to the present invention in which a gap between the side plates and the metal belts is controlled to prevent metl leakage therebetween will be described below.

Since an external force applied upon the metal belts differs between the opposite side edge portions of the mtal belts and the other portion thereof due to variations in the tension applied to the metal belts and the static pressure of the molten steel, there is the possibility that the gap between the metal belt and the side plates is widened and the molten steel enters therein to cause melt leakage.

The object of the following embodiments according to the present invention is to prvent the melt leakage through controlling the gaps between the metal belts and the mold short side plates.

In the following embodiments, the cooling pads each contain three water feed headers partitioned in the width direction of the metal belt, as shown in FIG. 3(b). That is, the inside of the cooling pad is divided into the side headers for the water openings 11 opposed to the back face of the metal belt at the side edge portions at which the metal belt contacts with the side plates, and the center headers sandwiched between the side headers, thereby allowing independent adjustment of the pressure of the water film formed on the back face of the metal belt at the side edge portions. By so adjusting, the gap between the metal belt and the side plate is controlled by varying the pushing force of the metal belt to the mold short side plate to prevent melt leakage.

When the gap is to be controlled, at the boundary between the zone at which the molten steel or cast strip is contacted with the metal belt and the zone at which the molten steel or cast strip is in no contact with the metal belt, the thickness of the water film, the pressure of the water film, and the pushing force of the metal belt to the mold short side plate are measured, for instance, by a supersonic wave type water film thickness meter buried in the cooling pad 8, a semiconductor type pressure gauge buried int he cooling pad 8, and a load cell provided at the mold short side plate, respectively. The gap is controlled by varying the amount of the water fed for the water film through the water feed side on the basis of the measured values.

Figure 5A:
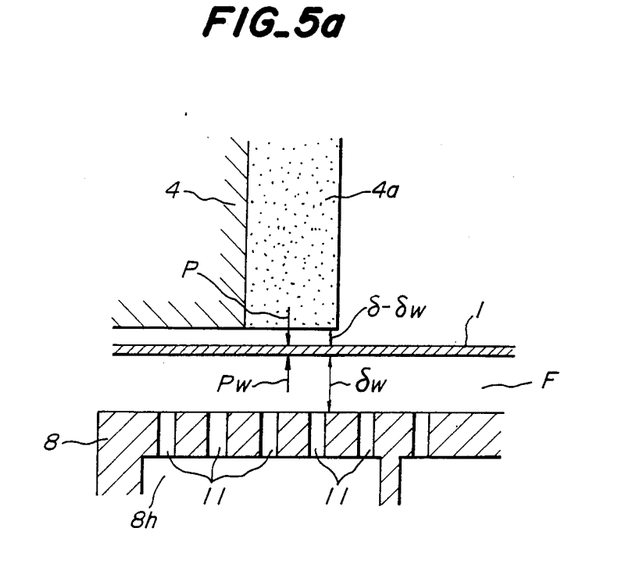
FIG. 5(a) and FIG. 5(b) are views of illustrating the relation between a pushing force of the metal belt and the pressure of the water film, the thickness of the water film, and a present gap.
Figure 5B:
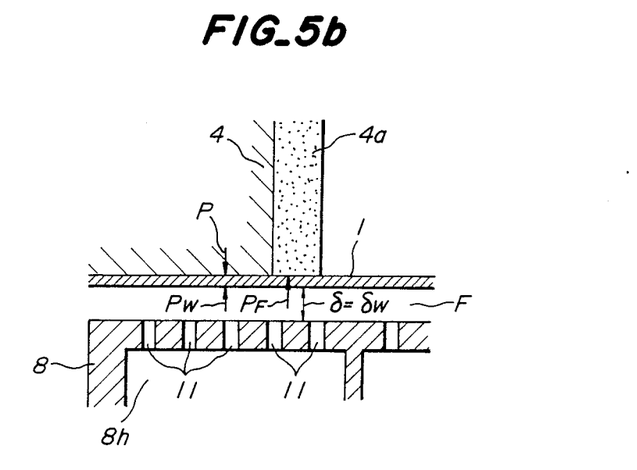

Furthermore, embodiments according to the present invention in which the gap between the metal belt and the mold short side plate is controlled will be explained below with reference to FIGS. 5(a) and 5(b).

The following are preferred embodiments according to the present invention for preventing a melt leakage in the belt type cast sheet continuous caster.

(1) $\delta$: 0.1 to 1.5 mm
(2) $\delta - 0.2$ mm $\leq \delta w < \delta$
(3) $P_F \leq 3$ atm (when $\delta = \delta w$)

in which $\delta, \delta w$, and $P_F$ are a set gap, the thickness of the water film behind the metal belt at the side edge portion, and a pushing force of the metal belt to the mold short side plate, respectively.

If $\delta$ is less than 0.1 mm, there is the likelihood that the water film cannot be assuredly maintainged, while if $\delta$ is over 1.5 mm, a greater amount of water is necessary for assuredly maintaining the specified pressure of the water film. Thus, $\delta$ is specified to be in a range from 0.1 to 1.5 mm.

Next, if $\delta w < \delta - 0.2$ mm, a metal leakage occurs through the gap between the metal belt and the mold short side plate. Thus, $\delta - 0.2$ mm $\leq \delta w < \delta$ (see FIG. 5(a)).

Moreover, if $\delta = \delta w$ and $P_w > 3$ atm, friction is vigrous between the metal belt and the mold short side plate and therefore their use life is extremely lowered. Thus, $P_F$ is set at not more than 3 atm.(see FIG. 5(b)).

Now, an experiment giving rise to the above condition (3) will be described below.

When casting was performed by a belt type continuous caster, the pressure of the water films formed behind the metal belts was varied every one charge. The water film pressure $P_w$ corresponding to the mold short side plates and the pushing force $P_F$ of the metal belt upon the mold short side plates were measured by a water film pressure gauge and a load cell attached to the mold short side plate, respectively, every charge, while the thickness $\delta w$ of the water film being detected by a supersonic wave type water film thickness meter. Thereby, the fins occurrence percentage, and a wearing ratio between the metal belt and the mold short side plate were examined.

Figure 6A:
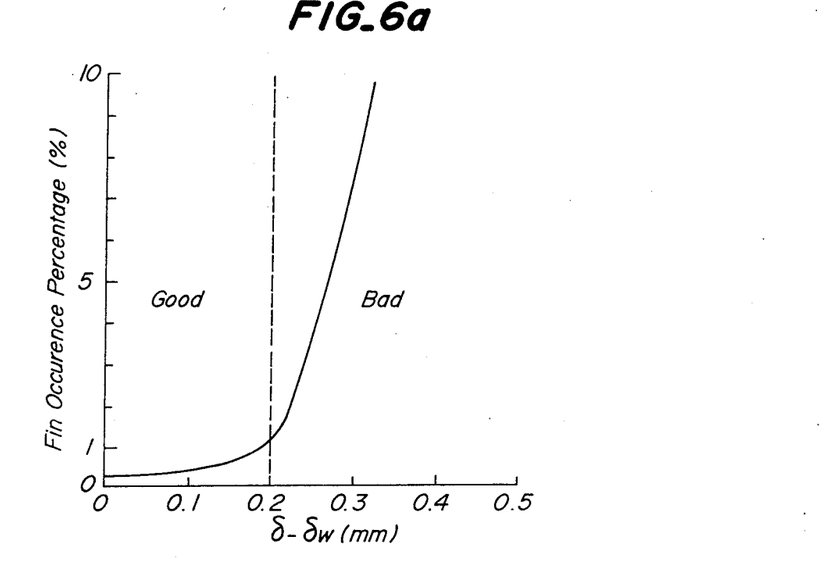
FIG. 6(a) and FIG. 6(b) are graphs showing the relation between the fin occurrence percentage and $\delta$-$\delta w$ and the relation between the wearing ratio and $P_F$, respectively.
Figure 6B:
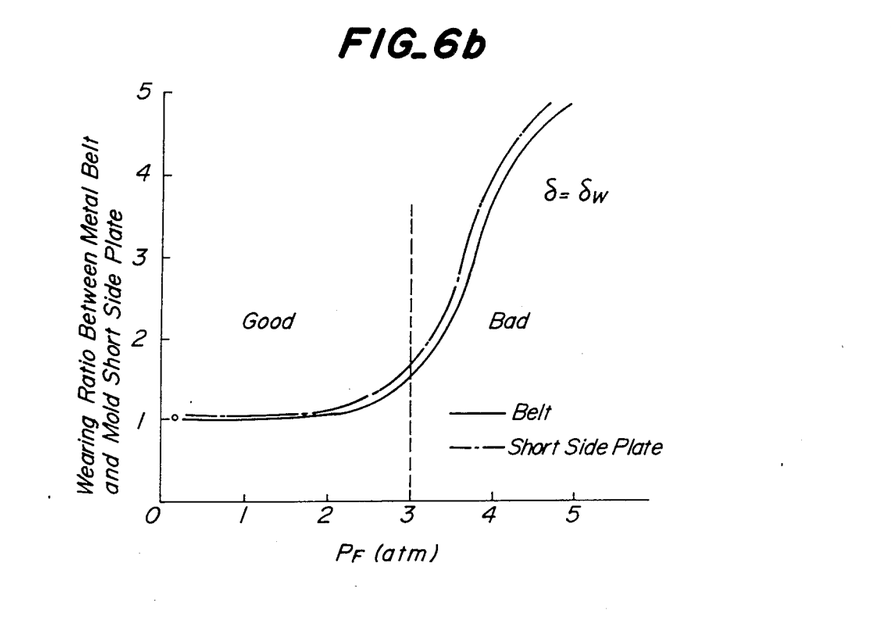

Results are shown in FIG. 6(a) and FIG. 6(b). Form this, it is understood that a range in which both the fins occurrence percentage and the wear ratio are low is:
(i) $\delta - \delta w \leq 0.2$ mm, or
(ii) $P_F \leq 3$ atm when the molding short side plate and the belt are intimately contacted with each other at the time of $\delta = \delta w$.

In the following, a specific test example will be given merely for illustrating the present invention.

160 tons of molten steel (low carbon aluminum-killed steel) under one heat was poured into a belt type continuous caster equipped with 1.2 mm thick metal belts made of SPCC (JIS G3141) and mold short side plates in which melt silica is fixed onto a Cu plate, and a thin cast strip of 40 mm thickness and 800 mm is width was cast under conditions shown in Table 1.

TABLE 1

|  | Casting conditions |
|---|---|
| Molten metal heating temperature | 30–40° C. |
| Casting speed | 8 m/min |
| Belt width | 1200 mm |
| Initial stage tension ($\sigma$o) | 14 kg/mm$^2$ |

In this test example, the fins occurrence percentage (%) is given by (total length of occurred fins in casting direction/total length of cast strip)×100, and relative comparison is made with reference to the casting at the time of $\delta - \delta w = 0.2$ mm($P_F = 0$).

Wearing amounts are relatively compared with reference to the casting at the time of $P_F = 1$ atm.

In the casting, the cooling pads shown in FIG. 3(b) were used, the water films were formed behind the metal belts.

A gap $\delta$ was set at 0.6 mm prior to the casting, and the pressure $P_W$ of the water film at the zones B was adjusted with water fed to the side headers of the cooling pads so that the thickness of the water films corresponding to the boundary zones between the mold short side plates and the molten steel might be in a range of 0.5 to 0.6 mm. The pressure $P_W$ of the water film at the zone B was adjusted to 2.5 to 3.5 atm, and that at the zone A was adjusted to 0.3 to 0.9 atm.

More specifically, the pushing force $P_F$ applied to the mold short side plates during the casting was detected by the load cell attached to the Cu plate of the mold short side plate, and the pressure $P_w$ of the water film was adjusted by varying the amount of fed water so that $P_F$ might always be in a range from 0 to 1.5 atm.

By making the above control, no melt leakage occurred during the casting, and wearing of the metal belts and the mold short side plates was extremely smaller.

According to the present inention, occurrences of melt leakage was not only prevented, but also the wearing of the metal belts and the mold short side plates can be reduced. Thus, the casting can be stably performed.

What is claimed is:

1. A cast sheet continuous caster of the type comprising a pair of opposed circulatorily movable belts, a pair of opposed side plates arranged along oppsoite side edge portions of the movable belts, coolers which each have numerous water feed openings and water discharge openings opened to the movable belt and are arranged behind the respective movable belts, said coolers each comprising a cooling header extending in a width direction of the movable belt, movable partition plates which are placed in the respective cooling headers, and drive means for moving the partition plates in the width direction of the movable belt, said movable belts and said side plates defining a casting space.

2. The belt type cast sheet continuous caster according to claim 1, wherein the movable partition plates are interlocked with the opposite side plates such that the movement of the former may be synchronized with that of the latter when the width of a cast sheet to be cast is varied.

3. The belt type cast sheet continuous caster according to claim 1, wherein water feed pipes or water discharge pipes are connected to corresponding header sections of the headers partitioned by the movable partition plates and are provided with respective flow rate adjusting valves or throttle valves.

4. The belt type cast sheet continuous caster according to claim 3, wherein portions of the header sections at zones where the movable belts are not in contact with the cast sheet constituted as low pressure cooling water supply zones.

5. The belt type cast sheet continuous caster according to claim 3, wherein the flow rate adjusting valves or throttle valves are so controlled that the pressure of the water film at a portion of each of the header sections at which the movble belts are just in contact with the side plates is made higher.

6. The belt type cast sheet continuous caster according to claim 1, wherein a higher temperature fluid pipe line is connected to a part of the header sections partitioned by the movable partition plates and a lower temperature fluid pipe line is connected to the remainder.

7. The belt type cast sheet continuous caster according to claim 6, wherein warm water is used as a higher temperature fluid in the high temperature fluid pipe line.

8. The belt type cast sheet continuous caster according to claim 6, wherein steam is used as a higher temperature fluid in the high temperature fluid pipe line.

9. A method of preventing melt leakage at sliding portions between mold short side plates and the metal belts in a belt type cast sheet continuous caster comprising metal belts and mold short side plates arranged along side edge portions of the metal belts and coolers which each have numerous water feed openings and water discharge openings to the metal belt and are arranged behind the respective metal belts, said metal and said side plates defining a casting space, said method comprising controlling gaps between the metal belts and the mold short side plates by varying a pushing force of the metal belts to the mold short side plates including the step of varying the pushing force of the metal belts to the mold short side plates such that the pressure of a water film applied to the back face of the metal belt over the width direction of the metal belt is made larger on the side portions of the mold short side plates and smaller at the central portion.

10. A method of preventing melt leakage at sliding portions between mold short side plates and the metal belts in a belt type cast sheet continuous caster comprising metal belts and mold short side plates arranged along side edge portions of the metal belts and coolers which each have numerous water feed openings and water discharge openings to the metal belt and are arranged behind the respective metal belts, said metal and said side plates defining a casting space, said method comprising controlling gaps between the metal belts and the mold short side plates by varying a pushing force of the metal belts to the mold short side plates including the step of varying the pushing force of the metal belt to the mold short side plates by not more than 3 atm.

11. A method of preventing melt leakage at sliding portions between mold short side plates and the metal belts in a belt type cast sheet continuous caster comprising metal belts and mold short side plates arranged along side edge portions of the metal belts and coolers which each have numerous water feed openings and water discharge openings to the metal belt and are arranged behind the respective metal belts, said metal and said side plates defining a casting space, said method comprising controlling gaps between the metal belts and the mold short side plates by varying a pushing force of the metal belts to the mold short side plates including the step of controlling a gap $\delta(mm)$ between the metal belt and the mold short side plates in relation to the thickness $\delta w(mm)$ of the water film during casting to satisfy the following formula:

$$\delta - 0.2 \text{ mm} \leq \delta w < \delta.$$

* * * * *